3,154,594
PRODUCTION OF ORGANIC COMPOUNDS CONTAINING CARBON-TO-CARBON DOUBLE BONDS IN TERMINAL POSITIONS ONLY
Irving E. Levine, Stinson Beach, Calif., assignor to California Research Corporation, San Francisco, Calif., a corporation of Delaware
No Drawing. Filed Apr. 24, 1962, Ser. No. 189,710
3 Claims. (Cl. 260—683)

This invention relates to a novel process for preparing terminally unsaturated monoolefins from polyunsaturates having a terminal double bond. More particularly, this invention relates to a novel method of preparing terminally unsaturated monoolefins from polyunsaturated aliphatic hydrocarbons by preparing the aluminum derivative of the terminal double bond, reducing the other sites of unsaturation and regenerating the terminal double bond.

Numerous methods are known for protecting double bonds while carrying out reactions with other functional groups present in the molecule. The classical addition of bromine to the double bond has found frequent employment. Chemistry of Carbon Compounds, E. H. Rodd, Elsevier Publishing Co., Amsterdam (1951), p. 251. Double bonds may also be protected by epoxidation with a peracid and then regenerating the double bond by treatment with a phosphite. See, e.g., C. B. Scott, J. Org. Chem. 22 1118 (1957).

The above methods of protecting double bonds from reaction, as well as many other reactions of double bonds, are not useful when a terminal double bond is to be protected during reduction of internal aliphatic unsaturation, i.e., a non-terminal carbon-to-carbon double bond. Frequently the reagent does not discriminate between internal and terminal unsaturation or the product formed by the reagent is not stable under the reduction conditions, e.g., alkyl vicinal dibromides. Furthermore, selective hydrogenation is virtually impossible to provide a compound having only terminal unsaturation from a polyunsaturated compound. For example, in the hydrogenation of vinylcyclohexene-4 with Raney Ni, the product from introducing one mol of hydrogen is 4-ethylcyclohexene.

It has now been found that polyolefins having only terminal unsaturation may be obtained by first preparing the alkyl aluminum derivative, reducing the internal unsaturation by catalytic hydrogenation and then regenerating the terminal olefin, i.e., 1-alkene. The terminally unsaturated olefins having no internal unsaturation are particularly valuable as monomers in stereoregular polymers.

This method finds particular advantage in the preparation of vinylcyclohexane. Butadiene is readily dimerized to form vinylcyclohexene-4. The double bond in the ring is undesirable in many applications. The internal olefin causes the polymer of vinylcyclohexene-4 to be susceptible to oxidation and may result in undesired crosslinking. The monoolefin may be polymerized to valuable high melting polymers. It is, therefore, of great advantage to be able to remove the internal unsaturation present in the ring, while preserving the functionally desirable terminal olefinic bond.

The organo-aluminum compound derived from the polyolefin having terminal unsaturation may be prepared by displacement or addition. In displacement, the polyolefin is treated with a trialkyl aluminum, preferably trilower alkyl aluminum, e.g., triisobutyl aluminum, trineohexyl aluminum, etc., the reaction proceeding according to the following equation:

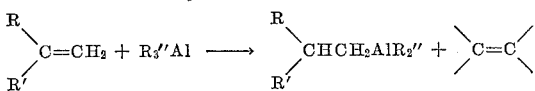

R and R' can be hydrogen, an aliphatic radical, such as alkyl, alicyclic, or alicyclicalkyl, at least one being other than hydrogen and having internal unsaturation. R or R' or both may be, by way of illustration, 2-butenyl, 4-methyl-3-pentenyl, 2-cyclopentenyl, 3-cyclohexenyl, 2,4-cyclohexadienyl, 4,6-octadienyl, etc. It is preferred that R and R' have a total of not more than 10 carbons and, preferably, not more than 6. Moreover, it is further preferred that R be hydrogen and R' be a mono-unsaturated aliphatic radical.

Compounds useful in this invention are illustrated by 1,4-octadiene, 4-methyl-1,4-hexadiene, 1,5-decadiene, vinyl-3-cyclopentene, vinyl-4-cyclooctene, etc.

While not essential, it is desirable that the terminal olefinic linkage be unconjugated with the other double bonds in the molecule. When dealing with Diels-Alder adducts of dienes, this will generally be true.

R'' may be any alkyl group having a β-hydrogen and a boiling point below RR'CH=CH$_2$. Preferred alkyl groups as R'' are propyl, butyl, isobutyl, etc., those having from 3 to 6 carbons.

The addition reaction is illustrated by the following equation:

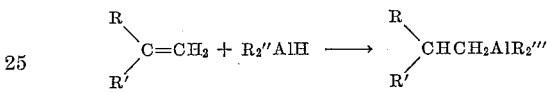

R'' may be hydrogen or any alkyl radical, preferably hydrogen or an alkyl radical which is less likely to undergo dissociation than RR'C=CH$_2$, for example, ethylene. R''' may be alkyl, including RR'CHCH$_2$, which is preferred. (RR'CHCH$_2$)$_3$Al would be obtained from aluminum hydride, i.e., when R'' is hydrogen. R and R' are as defined previously.

The addition and displacement reactions are well known in the art. See for, example, U.S. Patent Nos. 2,826,598 and 2,835,689. Variations in preparation and the choice of alkyl for the trialkyl aluminum is one of manipulative expedience and within the limitations already discussed is otherwise not critical.

The hydrogenation of the unsaturated aliphatic aluminum compound may be carried out using catalysts which are active at relatively low temperatures, e.g., the noble metals, such as platinum and palladium and Raney nickel. The preferred catalyst is Raney nickel. The temperature for the hydrogenation should not exceed 75° C. and is preferably in the range 0°–50° C. or even at lower temperatures. At the upper limits, hydrogenolysis of the aluminum carbon bond begins to occur. Solvents for the hydrogenation should be inert to the reactants and are preferably saturated hydrocarbons, e.g., pentane, heptane, etc. The reduction is carried out at atmospheric pressure or at superatmospheric pressures. The pressure will usually not exceed 200 atm., and is preferably in the range 1–100 atm. Particularly preferred is 5–50 atm. Increasing pressure permits a corresponding decrease in the temperature necessary for a reasonable rate of hydrogenation.

The monoolefin having only terminal unsaturation may then be generated by heating at a temperature in the range of about 100°–200° C. See, e.g., U.S. Patent No. 2,843,474. When using temperatures in the lower portion of the range, i.e., below 160° C., it is necessary to add mono-olefinic hyrocarbon having terminal unsaturation and a boiling point significantly higher than that of the desired olefin. This is particularly necessary below 135° C. but becomes less so above this temperature in the range of 135°–160° C.

When vinylcyclohexane is being prepared, olefins such as 1-dodecene, 1-tetradecene, 1-vinyldecalin, etc., may be used. The temperature for the exchange will usually be in the range of 100°–160° C. The desired olefin may be removed by distillation, in an inert atmosphere, either at atmospheric pressure or in vacuo, depending on its boiling point.

The thermal dissociation may be accomplished at about 150°–200° C. As the olefin is generated, it may be removed by distillation, in an inert atmosphere, either at atmospheric or reduced pressure, depending on the olefin's boiling point. The remaining aluminum hydride may be recycled, if desired, and used to generate the alkyl aluminum compound.

The generation of the desired olefin in the presence of an auxiliary olefin may be considered an exchange reaction. It is therefore necessary to have at least a stoichiometric equivalent of the auxiliary olefin used for displacing. Usually less than tenfold excess will be used. The higher boiling auxiliary olefin replaces the alkyl group bonded to aluminum, forming the desired olefin. The desired olefin is removed from the high temperature zone at reduced or atmospheric pressure depending on its boiling point.

The thermal dissociation may be accomplished at about 150°–200° C. There is thus a temperature overlap during which an auxiliary olefin may be added to enhance the rate. As the desired olefin is generated, it is removed from the reaction zone as indicated when the auxiliary olefin is present. The remaining aluminum hydride may be recycled, if desired, and used to regenerate the alkyl aluminum compound.

During the generation of the olefin, it is necessary to maintain an inert atmosphere to prevent reaction with the alkyl aluminum. Such gases as nitrogen, helium, argon suffice.

The following examples will serve to further illustrate the process of the present invention.

*Example I*

Distilled triisobutyl aluminum, 71.1 grams, 0.3585 mol, was charged to a three-necked flask equipped with a dropping funnel, nitrogen inlet, and vapor exhaust line. The exhaust line was passed to a Dry Ice trap. With the contents of the flask at 25° C., redistilled 4-vinylcyclohexene, 139.6 grams, 1.290 mols, was introduced into the flask through the dropping funnel over a period of 0.5 hour during which time the temperature of the flask rose to 38° C. The flask was then heated to 100° C. and isobutene started to collect in the Dry Ice trap. The flask was then heated up to 130° C. over a period of five hours during which time 55.2 grams, 0.984 mol. of isobutene was collected in the trap. (This represents 91.5% of the isobutene charged in the form of triisobutyl aluminum.) Unreacted vinylcyclohexene, 24.4 grams, was distilled from the flask at a temperature of 113° C. and a pressure of 3 mm. of mercury. The material remaining in the flask was a clear, colorless, viscous liquid weighing 127.5 grams and representing a yield of 100.3%, assuming the entire mixture to be tri-(cyclohexenylethyl) aluminum.

*Example II*

Forty-four grams of the mixture produced in Example I, 0.124 mol, assuming it to be all tri-(cyclohexenylethyl) aluminum, and 80 ml. of cyclohexane and 5 to 10 grams of Raney nickel were charged to a rocker bomb equipped with a hydrogen inlet. The bomb was pressured with hydrogen to a pressure of 20 to 65 atmospheres over a period of 7 hours while the bomb was maintained at a temperature of 24 to 27° C. During this time, the contents of the bomb adsorbed 0.342 mol, of hydrogen. The contents of the bomb were transferred to a distillation flask and cyclohexane was distilled therefrom to a final temperature of 83° C. and a final pressure of 2 mm. of mercury. The material remaining in the flask weighed 43 grams.

*Example III*

The material produced in Example II, 43 grams, was dissolved in 89.5 grams, 0.532 mol, of 1-dodecene in a distillation flask, and the temperature of the flask was raised to 100° C. The pressure was lowered to about 50 mm. of mercury and the temperature was gradually increased to 145° C. over a period of 6 hours during which time 29.6 grams, 0.269 mol, of vinylcyclohexane was collected in a receiver. The vinylcyclohexane was identified by boiling point, refractive index, and infrared spectra. This represented an overall yield of 67.5% for the three steps involved in Examples I, II, and III.

*Example IV*

Tri-(cyclohexylethyl) aluminum, 29.5 grams, 0.0818 mol, was charged to a distillation flask together with 60 ml. of n-dodecane. The flask was heated to a temperature of 130° C. and was then heated slowly to a temperature of 164° C. and evacuated to 3 mm. of mercury pressure. During this time 1.8 grams, 0.016 mol, of vinylcyclohexane was distilled from the flask with excess dodecane.

*Example V*

A mixture of 60% triisobutyl aluminum and 40% diisobutyl aluminum hydride, 61.0 grams, 0.357 mol of aluminum, was charged to a three-necked flask under a nitrogen atmosphere; and 130 grams, 1.20 mols, of distilled 4-vinylcyclohexene was added thereto through a dropping funnel. The flask was equipped with a nitrogen inlet and an outlet connected to a Dry Ice trap. The flask was heated to a temperature of 100° C. at which time isobutene started to collect in the trap, and heating was continued to a temperature of 155° C. over a period of 5 hours during which time 47.8 grams, 0.854 mol (92% of theory) of isobutene was collected in the trap. Unreacted vinylcyclohexene, 23.8 grams, was distilled from the mixture under reduced pressure; final conditions, 99° C. and 7 mm. of mercury. The material remaining in the distillation flask weighed 116.1 grams indicating a substantially quantitative yield of tri-(cyclohexenylethyl) aluminum. The material was a clear, colorless, viscous liquid having a density of 0.97 grams per ml.

This invention may also find use when saturated alkyl aluminum compounds are desired. In instances when a polyunsaturated aliphatic compound is more accessible than the monoolefinic terminally unsaturated compound, this invention provides a method whereby the saturated alkyl aluminum compound may be obtained.

This invention is a continuation-in-part of co-pending application No. 3,273, filed January 19, 1960, now abandoned.

As will be evident to those skilled in the art, various modifications on this process can be made or followed, in the light of the foregoing disclosure and discussion, without departing from the spirit or scope of the disclosure or from the scope of the following claims.

I claim:

1. A method for preparing a terminally unsaturated monoolefinic hydrocarbon from an unconjugated polyolefinic unsaturated hydrocarbon having terminal unsaturation selected from the group consisting of alkyl and alicyclic hydrocarbons which comprises:

(1) converting said polyunsaturated aliphatic hydrocarbon to an organo-aluminum compound;

(2) hydrogenating said organo-aluminum compound in the presence of a catalyst selected from the group consisting of platinum, palladium and Raney nickel at a temperature in the range of 0°–75° C. and at a pressure in the range of about 1 to 200 atmospheres;

(3) generating a mono-unsaturated terminal olefin by heating the saturated organo-aluminum compound resulting from the hydrogenation at a temperature in the range 100°–200° C., at temperatures in the range of 100°–160° C. an auxiliary olefinic hydrocarbon having terminal unsaturation is added having a boiling point higher than the desired monounsaturated terminal olefin; and (4) isolating the desired terminally unsaturated monoolefin.

2. A method according to claim 1 wherein said polyolefinic unsaturated hydrocarbon is vinylcyclohexene-4, said catalyst is Raney nickel, said temperature range for hydrogenation is about 0°–50° C., said pressure range for hydrogenation is about 1–100 atmospheres and vinylcyclohexane is generated by heating at a temperature in the range 150°–200° C.

3. A method according to claim 1, wherein said polyolefinic unsaturated hydrocarbon is vinylcyclohexene-4, said catalyst is Raney nickel, said temperature range for hydrogenation is about 0°–50° C., said pressure range for hydrogenation is about 1–100 atmospheres and vinylcyclohexane is generated by heating at a temperature in the range 100°–160° C. in the presence of an auxiliary olefinic hydrocarbon having terminal unsaturation and having a boiling point higher than vinylcyclohexane.

References Cited in the file of this patent

UNITED STATES PATENTS

| | | |
|---|---|---|
| 2,622,111 | Haensel | Dec. 16, 1952 |
| 2,673,886 | Steadman | Mar. 30, 1954 |
| 2,826,598 | Ziegler et al. | Mar. 11, 1958 |
| 2,835,689 | Ziegler et al. | May 20, 1958 |